(12) United States Patent
Ishibe

(10) Patent No.: US 6,256,132 B1
(45) Date of Patent: Jul. 3, 2001

(54) MULTI-BEAM SCANNING OPTICAL SYSTEM AND IMAGE FORMING APPARATUS USING THE SAME

(75) Inventor: Yoshihiro Ishibe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,939

(22) Filed: Jun. 13, 2000

(30) Foreign Application Priority Data

Jun. 16, 1999 (JP) .................................................. 11-169599

(51) Int. Cl.[7] .................................................. G02B 26/08
(52) U.S. Cl. .......................... 359/204; 359/205; 359/206; 359/207; 347/243; 347/244
(58) Field of Search .................................. 359/204–207, 359/216–219; 347/233, 243, 244

(56) References Cited

U.S. PATENT DOCUMENTS

| | | | |
|---|---|---|---|
| 5,834,766 | * 11/1998 | Suhara | 250/234 |
| 5,859,720 | 1/1999 | Ishibe | 359/196 |
| 5,995,131 | 11/1999 | Fujibayashi et al. | 347/258 |
| 6,005,243 | * 12/1999 | Yamazaki | |
| 6,067,106 | 5/2000 | Ishibe et al. | 347/258 |

FOREIGN PATENT DOCUMENTS

| | | |
|---|---|---|
| 5-333281 | 12/1993 | (JP) . |
| 9-197308 | 7/1997 | (JP) . |

* cited by examiner

Primary Examiner—James Phan
(74) Attorney, Agent, or Firm—Fitzpatrick, Cella, Harper & Scinto

(57) ABSTRACT

A multi-beam scanning optical apparatus comprises a light source having a plurality of light emitting sections, a rotary polygon mirror having deflection surfaces for deflecting light beams emitted from the light emitting sections, a first optical system arranged on the optical path between the light source and the polygon mirror for transforming the light beams into so many convergent or divergent light beams, a second optical system for focussing the convergent or divergent light beams on a deflection surface of the rotary polygon mirror as so many linear images extending in the main-scanning direction, and a third optical system for focussing the deflected light beams onto a surface to be scanned, which is typically a photosensitive surface of a drum and is held in a substantially conjugate relationship in the sub-scanning direction with the deflection surface.

8 Claims, 10 Drawing Sheets

MULTI-BEAM SCANNING OPTICAL SYSTEM AND IMAGE FORMING APPARATUS USING THE SAME

BACKGROUND OF THE INVENTION

1. Field of the Invention

This invention relates to a multi-beam scanning optical system using a light source having a plurality of light emitting sections such as a semiconductor laser array and adapted to high speed high density recording. A multi-beam scanning optical system according to the invention can suitably be used for an image forming apparatus such as a laser beam printer or a digital copying machine.

2. Related Background Art

Recently, there is a growing demand for image forming apparatus such as laser beam printer and digital copying machines that can produce images at high speed with an enhanced level of resolution. Multi-beam scanning optical systems using a light source having a plurality of light emitting sections such as a semiconductor laser array have been proposed to meet the demand.

FIG. 1 of the accompanying drawings is a schematic cross sectional view of a known multi-beam scanning optical system taken along the main-scanning direction. Referring to FIG. 1, a plurality of light beams emitted from so many semiconductor lasers (or a semiconductor laser array) 91 are substantially collimated by a collimator lens 92 and then converged only in the sub-scanning direction by a cylindrical lens 94 having a predetermined refractive power only in the sub-scanning direction. The light beams are then trimmed by an aperture stop 93 and focussed on or near a deflecting plane (reflecting plane) 95a of an optical deflector 95, which is a rotary polygon mirror, to produce a substantially linear image extending in the main-scanning direction. Then, the light beams deflected/reflected by the deflecting plane 95a of the polygon mirror 95 that is rotating at a predetermined angular velocity in the sense of arrow 95b in FIG. 1 are focussed on the surface of a photosensitive drum 97 to be scanned as so many spots by way of a pair of fθ lenses 96a and 96b of a scanning optical system 96 and made to optically scan the surface of the photosensitive drum 97 in the direction of arrow 97b in FIG. 1.

FIGS. 2 and 3 are schematic illustrations of the arrangement of light emitting sections of the light source of a multi-beam scanning optical system. In FIGS. 2 and 3, reference symbols A and B denote respective light emitting sections and reference symbol M denote the main-scanning direction whereas reference symbol S denotes the sub-scanning direction.

In a multi-beam scanning optical system having a configuration as described above, if a plurality of light emitting sections A and B are arranged longitudinally along the sub-scanning direction as shown in FIG. 2, the scanning lines on the surface of the photosensitive drum produce large intervals in the sub-scanning direction that are by far greater than the values required for achieving a desired recording density. To avoid this problem, the light emitting sections A and B are arranged on a line that forms a non-zero angle δ with the sub-scanning direction (S) as shown in FIG. 3. Thus, the intervals separating the scanning lines on the surface of the photosensitive drum can be accurately regulated to achieve the desired recording density by selecting an appropriate value for angle δ. In other words, the light emitting sections of the light source are arranged at respective positions that vary from each other in terms of both the main-scanning direction (M) and the sub-scanning direction (S) that is perpendicular relative to the main-scanning direction (M).

Meanwhile, if the light beams striking the surface of the photosensitive drum are regularly reflected by it and returned to the semiconductor lasers, the oscillations of the semiconductor lasers can become unstable. Additionally, if the regularly reflected light beams are returned to the optical system, they can be reflected once again by the surface of the optical system to irradiate the surface of the photosensitive drum and give rise to a ghost there. To avoid these problems, the angle (of incidence) α between the light beams striking the surface 97 of the photosensitive drum and the normal to the surface 97 of the photosensitive drum is made equal to a predetermined value in the sub-scanning direction in known multi-beam scanning optical systems as shown in FIG. 4. With this arrangement, the light beams emitted from the semiconductor lasers are not regularly reflected by the surface 97 of the photosensitive drum and returned to the optical system. FIG. 4 is a schematic cross sectional view of a known multi-beam scanning optical system taken along the sub-scanning direction. Note that, in FIG. 4, the components same as those of FIG. 1 are denoted respectively by the same reference symbols and will not be described any further.

Then, as shown in FIGS. 5A and 5B, the plurality of scanning lines on the surface 97 of the photosensitive drum by a multi-beam scanning optical system having a configuration as described above show different scanning magnifications as illustrated in FIGS. 5A and 5B. As a result, the spots formed by focussed beams of light on the surface 97 of the photosensitive drum show a displacement (D) in the main-scanning direction to make it no longer possible to produce a high quality image. Note that FIGS. 5A and 5B are schematic cross sectional view of a principal portion of a known multi-beam scanning optical system and a photosensitive drum shown to illustrate the problem thereof. In FIGS. 5A and 5B, reference symbols 95 and 96 respectively denote a polygon mirror and a scanning lens system and reference symbol D denotes the displacement of beam spots.

A number of proposals have been made to dissolve the above identified problem, including those disclosed in Japanese Patent Applications Laid-Open Nos. 5-333281 and 9-197308. Japanese Patent Application Laid-Open No. 5-333281 describes an arrangement for reducing the displacement of focal point in the main-scanning direction by making the angle between the light beams striking the surface of the photosensitive drum and the normal to the surface of the photosensitive drum in the sub-scanning direction smaller than a predetermined value. On the other hand, Japanese Patent Application Laid-Open No. 9-197308 describes an arrangement for reducing the displacement of focal point in the main-scanning direction by arranging the imaging optical system eccentrically and regulating the extent of the eccentricity.

However, none of the proposed multi-beam scanning optical systems including those described in the above cited patent documents can satisfy both the requirement of reducing the displacement of focal point in the main-scanning direction and that of forming an excellent (spot-shaped) image.

More specifically, as pointed out, Japanese Patent Application Laid-Open No. 5-333281 describes an arrangement of making the angle between the light beams striking the surface of the photosensitive drum and the normal to the surface of the photosensitive drum in the sub-scanning direction smaller than a predetermined value. However, this arrangement can only reduce the displacement of focal point in the main-scanning direction to make it less remarkable. In other words, the method proposed in Japanese Patent Application Laid-Open No. 5-333281 cannot dissolve the problem of displacement of focal point in the main-scanning direction.

On the other hand, Japanese Patent Application Laid-Open No. 9-197308 describes an arrangement for reducing the displacement of focal point in the main-scanning direction by arranging the imaging optical system eccentrically and regulating the extent of the eccentricity. However, when the imaging optical system is arranged eccentrically, the spot-shaped image formed on the surface of the photosensitive drum can easily become deformed to make it difficult to realize a high quality and high speed image recording.

SUMMARY OF THE INVENTION

In view of the above described circumstances, it is therefore the object of the present invention to provide a multi-beam scanning optical system that can effectively reduce the displacement of focal point in the main-scanning direction and produce a high quality image. A multi-beam scanning optical system according to the invention can suitably be used for an image forming apparatus to produce high quality images at high speed.

According to the invention, the above object is achieved by providing a multi-beam scanning optical system comprising:

a light source having a plurality of light emitting sections arranged at respective positions varying from each other in terms of both the main-scanning direction and the sub-scanning direction perpendicular relative to the main-scanning direction;

a rotary polygon mirror having deflection surfaces for deflecting the plurality of light beams emitted respectively from the plurality of light emitting sections;

a first optical system arranged on the optical path between the light source and the rotary polygon mirror to transform the plurality of light beams into so may convergent or divergent light beams;

a second optical system for focussing the plurality of light beams on a deflection surface of the rotary polygon mirror as so many linear images extending in the main-scanning direction after passing through the first optical system; and a third optical system for focussing the plurality of light beams deflected by the rotary polygon mirror onto a surface to be scanned of a drum having its axis of rotation extending in the main-scanning direction, the third optical system holding the deflection surface and the surface to be scanned in a substantially conjugate relationship in the sub-scanning direction.

The plurality of light beams striking the surface to be scanned being inclined in the sub-scanning direction so as to make their principal rays to show a non-zero angle relative to the normal to the surface to be scanned, thereby producing a positional displacement among the focal points of the light beams on the surface to be scanned in a first direction parallel to the main-scanning direction, the convergent or divergent light beams entering the third optical system producing a relative positional displacement among the focal points thereof on the surface to be scanned in a second direction parallel to the main-scanning direction, the first direction and the second direction being opposite to each other.

According to the invention, there is also provided an image forming apparatus comprising:

a multi-beam scanning optical system as mentioned above;

a photosensitive drum provided a surface to be scanned and having its axis of rotation extending in the main-scanning direction;

a developing unit for developing an electrostatic latent image formed on the surface of the photosensitive drum by the light beams made to scan the surface by means of the scanning optical system into a toner image;

a transfer unit for transferring the developed toner image onto a toner image receiving member; and a fixing unit for fixing the transferred toner image on the toner image receiving member.

DESCRIPTION OF THE PREFERRED EMBODIMENTS

Embodiment 1

Figure 6A:
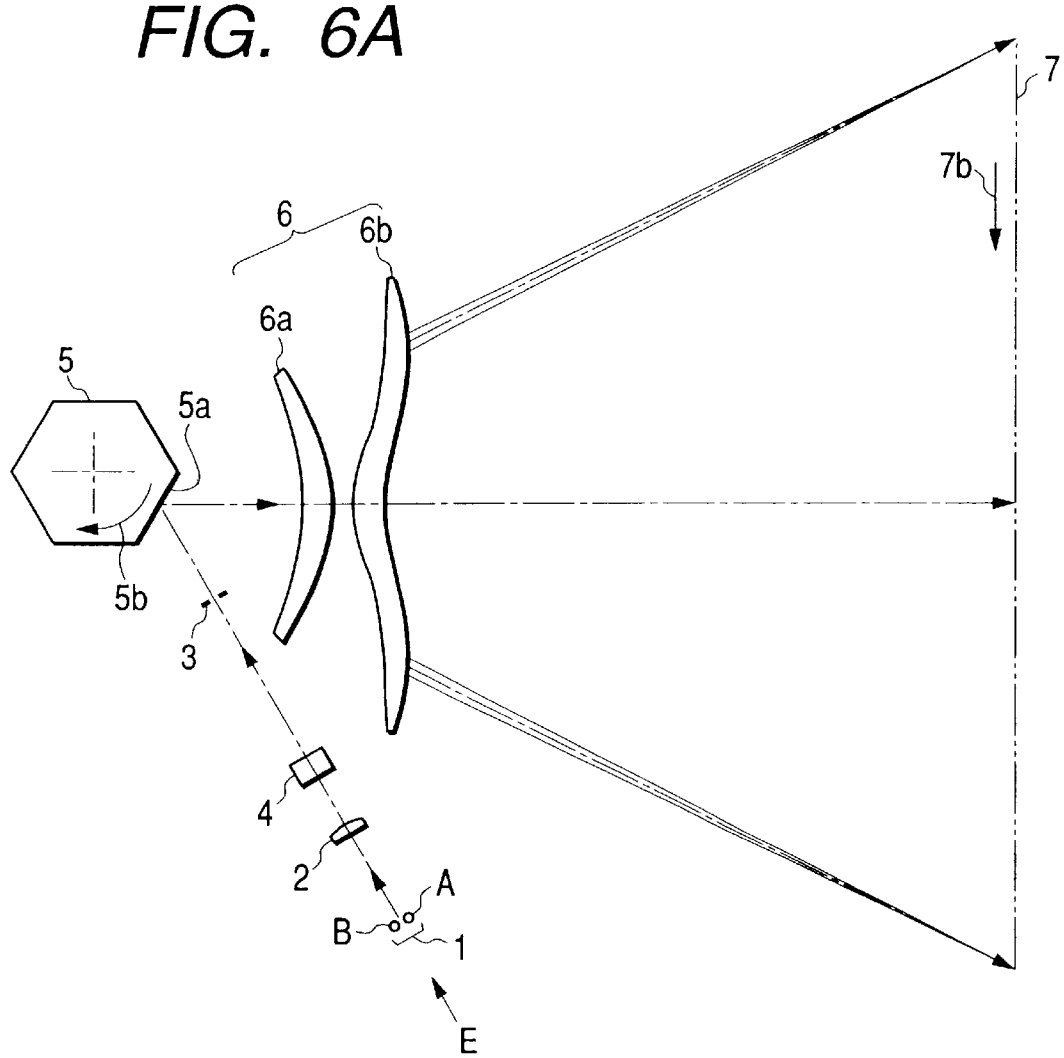
FIG. 6A is a schematic cross sectional view of a principal portion of Embodiment 1 of multi-beam scanning optical system according to to the invention and taken along the main-scanning direction.
Figure 7:
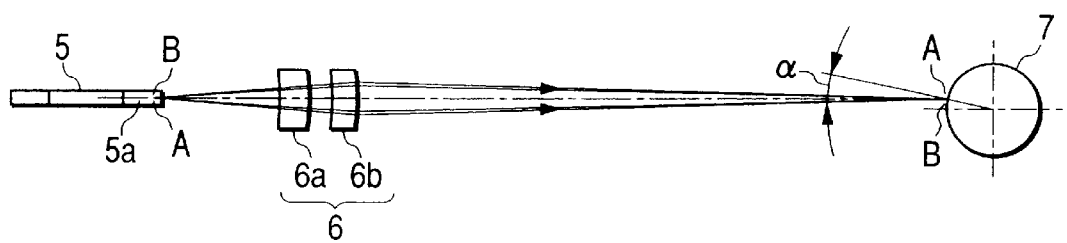
FIG. 7 is a schematic cross sectional view of a principal portion of Embodiment 1 of multi-beam scanning optical system according to the invention and taken along the sub-scanning direction.

FIG. 6A is a schematic cross sectional view of a principal portion of Embodiment 1 of multi-beam scanning optical system according to to the invention and taken along the main-scanning direction. FIG. 7 is a schematic cross sectional view of a principal portion of the multi-beam scanning optical system of FIG. 6A taken along the sub-scanning direction. In FIG. 7, the components same as those of FIG. 6A are denoted respectively by the same reference symbols and will not be described repeatedly.

Figure 6B:
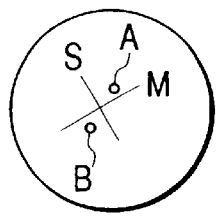
FIG. 6B is a schematic illustration of the arrangement of light emitting sections of the light source of Embodiment 1 of FIG. 6A.

Referring to FIG. 6A, reference symbol 1 denotes a light source. The light source 1 is a multi-semiconductor-laser (semiconductor laser array) comprising a plurality of light emitting sections (light emitting spots) A and B that are arranged in such a way that the line connecting them forms an angle with the sub-scanning direction. FIG. 6B shows the light emitting sections A and B of the light source 1 encircled and viewed in the direction of arrow E in FIG. 6A. In FIG. 6B, M indicates the main-scanning direction while S indicates the sub-scanning direction.

In FIG. 6A, reference symbol 2 denotes a condensing lens operating as first optical system. The condensing lens 1 transforms the plurality of light beams emitted from the light source 1 into convergent (or divergent) beams of light. Reference symbol 4 in FIG. 6A denotes a cylindrical lens (cylinder lens) operating as second optical system. The cylindrical lens shows a predetermined refractive power only in the sub-scanning direction so that, after passing through the condensing lens 2, the light beams are focussed on the deflection surface 5a of rotary polygon mirror 5, which will be described hereinafter, to form linear images extending in a plane intersecting the optical axis along the sub-scanning direction. Reference symbol 3 in FIG. 6A denotes an aperture stop, which aperture stop 3 limits the width of the light beams that have passed through the cylindrical lens 4.

In FIG. 6A, reference symbol 5 denotes a polygon mirror operating as deflection means (optical deflector). The polygon mirror 5 is driven to rotate at a constant rate in the direction of arrow 5b by a drive means (not shown) such as a motor.

Reference symbol 6 denotes an fθ lens (scanning optical system) having an fθ feature. The fθ lens system 6 comprises a pair of fθ lenses (first fθ lens and second fθ lens) 6a and 6b. The fθ lens system 6 focusses the plurality of light beams deflected/reflected by the rotary polygon mirror 5 on the surface to be scanned 7. More specifically, the fθ lens system 6 establishes an optically conjugate relationship between the deflection surface 5a of the rotary polygon mirror 5 and the surface to be scanned 7 in a plane intersecting the optical axis along the sub-scanning direction. An optical system having such a configuration can correct the toppling effect of the rotary polygon mirror that occurs due to, if slight, the inclination of the axis of rotation of the polygon mirror and/or the manufacturing error of the deflection surface 5a. Therefore, it is normally referred to as a toppling effect correcting optical system. The surface to be scanned 7 is the surface (image carrying surface) of a photosensitive drum having its axis of rotation running in the main-scanning direction.

Each of the pair of fθ lenses 6a and 6b is typically a toric lens. Preferably, at least one of the fθ lenses has a non-spherical surface in a plane intersecting the optical axis along the main-scanning direction. Such an fθ lens can be prepared by injection-molding using a plastic material and a metal mold.

In this embodiment, the light beams emitted from the light source (multi-semiconductor-laser) 1 are transformed into convergent beams of light by the condensing lens 2 before entering the cylindrical lens 4. The light beams entering the cylindrical lens 4 leave the lens 4 without being modified in the main-scanning section, i.e., the plane intersecting the optical axis along the main-scanning direction, and the quantity of light of the light beams is limited by the aperture stop 3 in that section. On the other hand, they are converged in the sub-scanning section, i.e., the plane intersecting the optical axis along the sub-scanning direction, and the quantity of light of the light beams is also limited by the aperture stop 3 in that section. As a result, the light beams form linear images extending in the main-scanning direction on the deflection surface 5a of the rotary polygon mirror 5. The plurality of light beams deflected/reflected by the deflection surface 5a of the rotary polygon mirror 5 are then focussed by the fθ lens system 6 to produce respective images that are so many spots of light on the surface to be scanned (surface of the photosensitive drum) 7. Then, the surface (surface of the photosensitive drum) 7 is scanned by the spots of light in the direction indicated by arrow 7b (main-scanning direction) in FIG. 6A as the rotary polygon mirror 5 is driven to rotate in the sense of arrow 5b in FIG. 6A. As a result, an image can be recorded on the surface to be scanned (surface of the photosensitive drum) 7 that operates as recording medium.

In this embodiment, the beams of light regularly reflected by the surface to be scanned (surface of the photosensitive drum) 7 are not returned to the optical system for the above described reason. More specifically, the light beams striking the surface to be scanned (surface of the photosensitive drum) 7 are inclined in the sub-scanning direction so as to make their principal rays to show a non-zero angle (of incidence) α relative to the normal to the surface to be scanned as shown in FIG. 7.

Note that the principal ray of the light beam forming spot A on the surface to be scanned (surface of the photosensitive drum) 7 and that of the light beam forming spot B on the surface are not parallel to each other in a rigorous sense of the word. Additionally, the position of the spot A and that of the spot B on the surface to be scanned (surface of the photosensitive drum) 7 are displaced relative to each other in the sub-scanning direction and hence the normals at the respective spots are not parallel relative to each other because the surface to be scanned is that of a drum. Thus, strictly speaking, the light beams striking the surface to be scanned are "inclined in the sub-scanning direction so as to make their principal rays to show respective non-zero angles (of incidence) relative to the respective normals to the surface to be scanned". However, for the purpose of simplification, the light beams striking the surface to be scanned are regarded to be "inclined in the sub-scanning direction so as to make their principal rays to show a predetermined angle α relative to the normal to the surface to be scanned".

Now, when the light beams striking the surface to be scanned (surface of the photosensitive drum) 7 are inclined in the sub-scanning direction so as to make their principal rays to show a predetermined angle α relative to the normal to the surface to be scanned (surface of the photosensitive drum) 7, there arises a problem that the spots of light formed by the focussed beams of light are displaced relative to each other in the main-scanning direction.

Now, the phenomenon of the displacement of the spots of focussed beams of light in the main-scanning direction will be discussed below by referring to FIG. 8. For the purpose of simplification, assume here that the light source has only a pair of light emitting sections.

Figure 8:
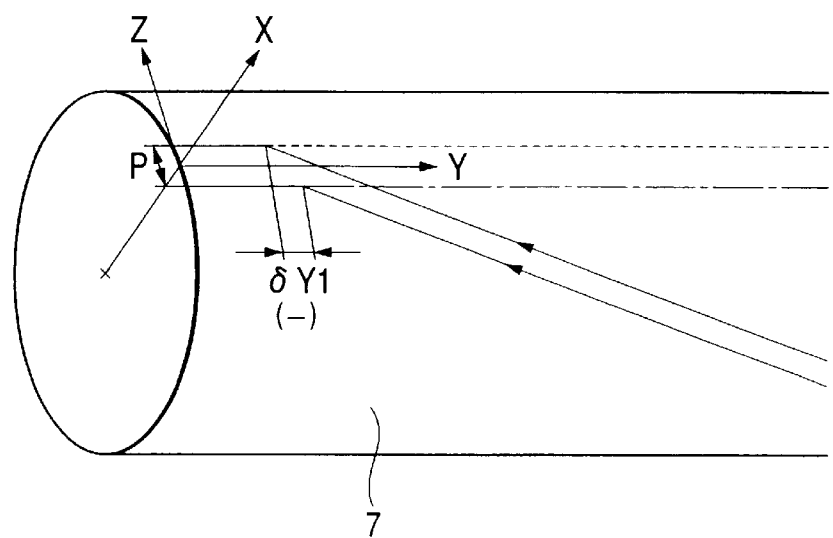
FIG. 8 is a schematic cross sectional view of a principal portion of Embodiment 1 multi-beam scanning optical system according to the invention, illustrating two scanning lines being used for parallel scanning.

FIG. 8 is a schematic cross sectional view of a principal portion of a multi-beam scanning optical system, illustrating two scanning lines being used on the surface to be scanned (surface of a photosensitive drum) 7 for parallel scanning. In FIG. 8, the main-scanning direction is expressed by the Y-axis while the sub-scanning direction along which the surface to be scanned (surface of the photosensitive drum) 7 is driven to move is expressed by the Z-axis and the normal to the surface to be scanned (surface of the photosensitive drum) 7 is expressed by the X-axis of an orthogonal coordinate system.

FIG. 8 illustrates the light beams when a maximum angle of view is used for scanning. Assume that the angle formed by the principal rays of the light beams and the optical axis of the fθ lens system 6 is β and the angle formed by the striking light beams and the X-Y plane is α under this condition.

Then, the optical paths of the two scanning lines produce a difference of length of δX along the direction in which the light beams proceed, which is expressed by formula (1) below:

$$\delta X = P \times \sin \alpha \qquad (1),$$

where P is the gap separating the scanning lines in the sub-scanning direction that are scanning the surface to be scanned (surface of the photosensitive drum) 7 simultaneously.

As the difference of length of δX is produced between the optical paths of the two light beams along the direction in which the light beams proceed, the principal rays of the two light beams striking the surface to be scanned (surface of the photosensitive drum) 7 are displaced in the main-scanning direction (direction of the Y-axis) and the (maximum) displacement δY1 is expressed by formula (2) below provided that the direction of increasing the scanning width as indicated by arrow Y in FIG. 8 is regarded as positive:

$$\delta Y1 = \delta X \times \tan \beta = P \times \sin \alpha \times \tan \beta \qquad (2).$$

It will be appreciated that δY1 takes a negative value in FIG. 8.

Since the displacement δY1 takes a negative value in this embodiment, it is so arranged that the (maximum) positional displacement δY2 in the main-scanning direction of each of the spots formed on the surface of the photosensitive drum 7 by the focussed light beams as a result of making convergent light beams enter the fθ lens system 6 as will be described hereinafter takes a positive value. On the other hand, if the positional displacement δY1 takes a positive value unlike this embodiment, the positional displacement δY2 is made to take a negative value. In short, the angle (of incidence) α and the extent of convergence of the light beams entering the fθ lens system 6 are so selected as to make the two positional displacement values offset each other.

Now, assuming that convergent light beams are made to enter the fθ lens system 6, the phenomenon of the displacement of the spots of focussed beams of light on the surface to be scanned (surface of the photosensitive drum) 7 in the main-scanning direction appears for the reason as discussed below. For the purpose of simplification, it is also assumed that the light source has only two light emitting sections.

Figure 1:
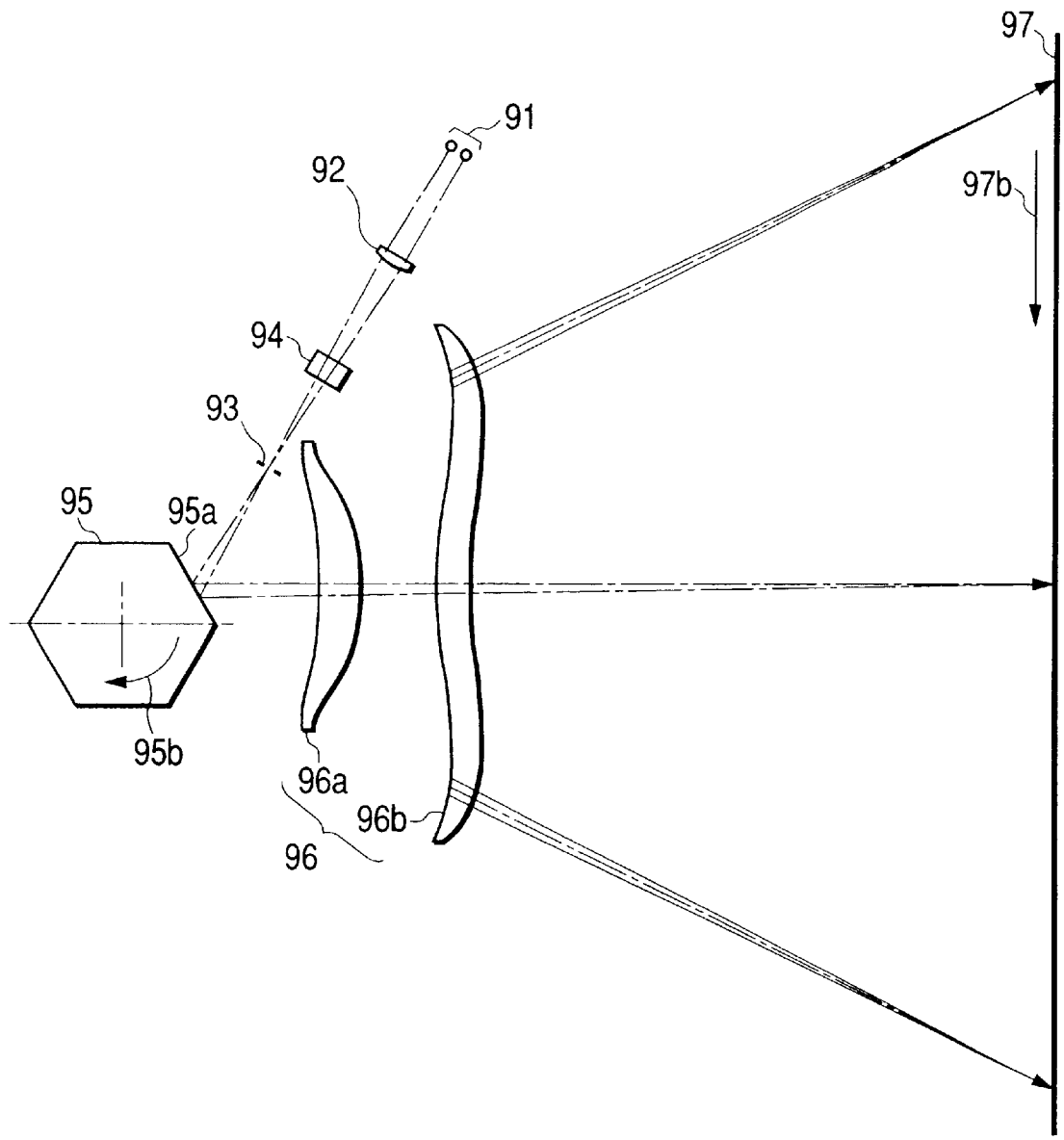
FIG. 1 is a schematic cross sectional view of a principal portion of a known multi-beam scanning optical system taken along the main-scanning direction.
Figure 2:
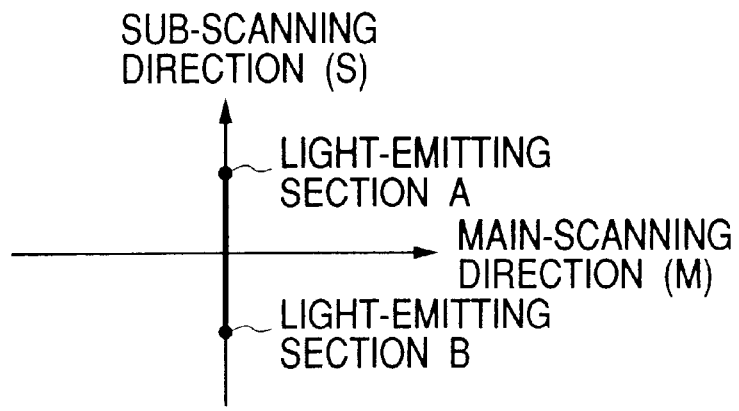
FIGS. 2 and 3 are schematic illustrations of the arrangement of light emitting sections of the light source of a known multi-beam scanning optical system, showing two possible arrangements of light emitting sections.
Figure 3:
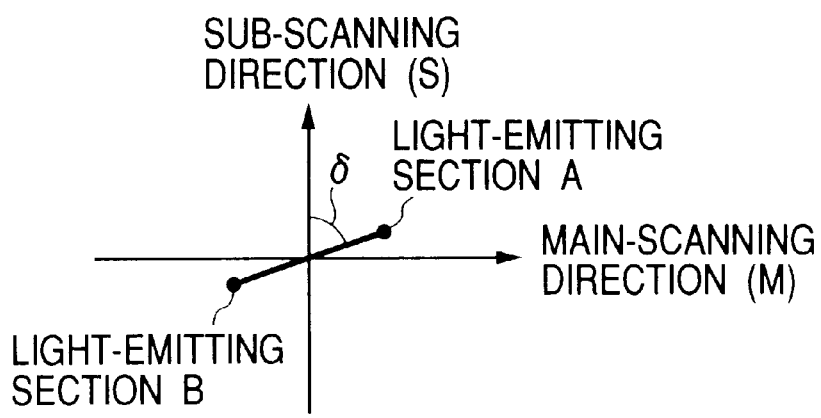
Figure 4:
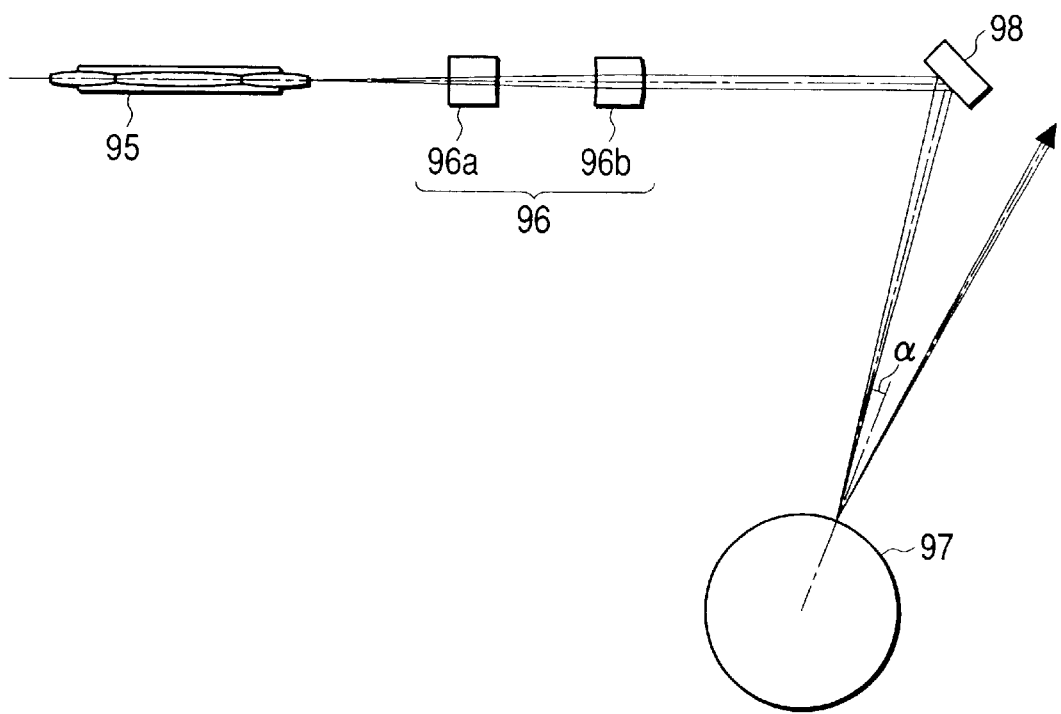
FIG. 4 is a schematic cross sectional view of a principal portion of a known multi-beam scanning optical system taken along the sub-scanning direction.
Figures 5A, 5B:
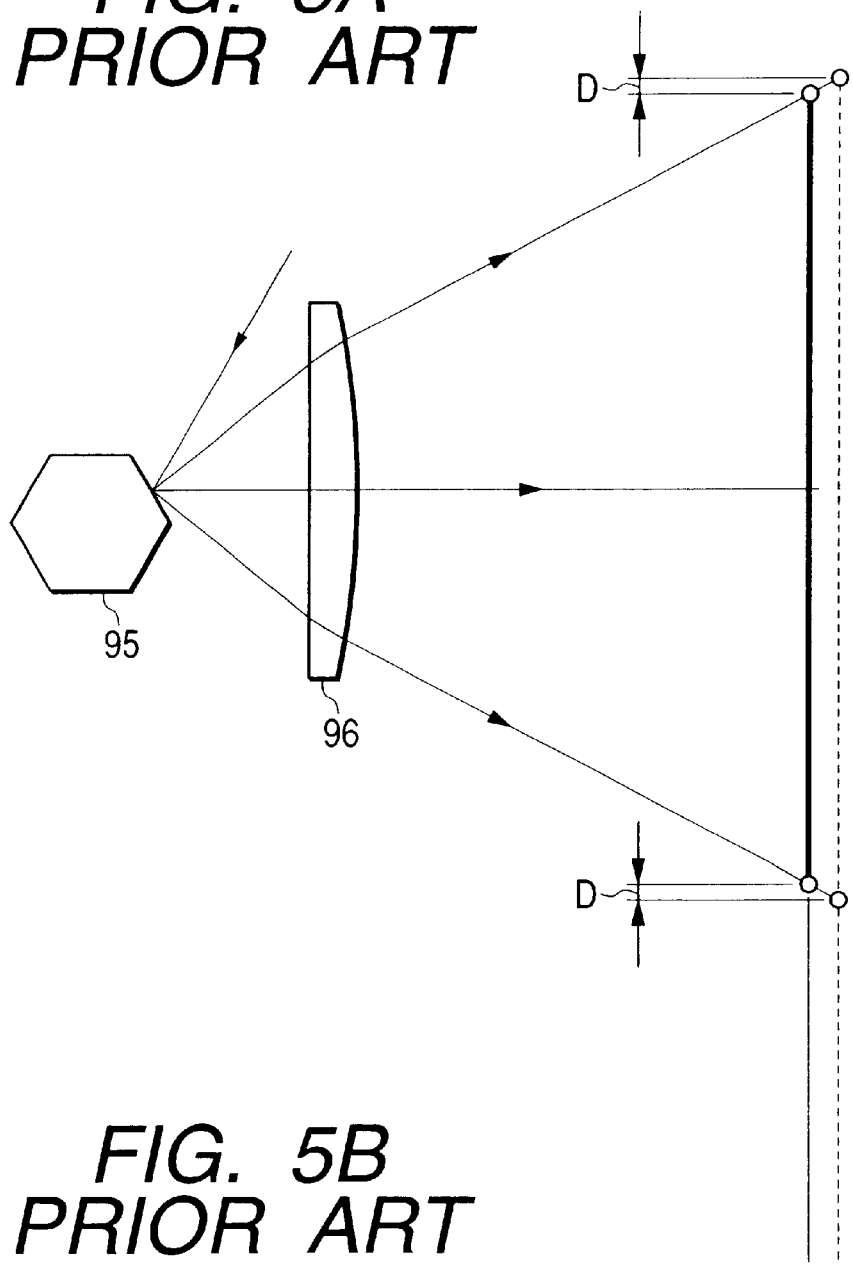
FIGS. 5A and 5B are schematic cross sectional views of a principal portion of a known multi-beam scanning optical system taken respectively along the main-scanning direction and the sub-scanning direction to illustrate a problem thereof.

As described earlier by referring to FIG. 4, in a multi-beam scanning optical system having a pair of light emitting sections that are inclined relative to the sub-scanning direction, the two light beams emitted from the light emitting sections show respective angles of reflection that are different from each other as they are deflected/reflected by the rotary polygon mirror so that they are focussed on the surface to be scanned (surface of the photosensitive drum) to form respective spots that are separated from each other in the main-scanning direction. Thus, in a multi-beam scanning optical system having such a configuration, one of the light beams is emitted from the corresponding light emitting section with a predetermined time lag of δT as viewed from the other light beam emitted from the other light emitting section that operates as reference so that the two light beams may be focussed at a same spot on the surface to be scanned (surface of the photosensitive drum).

Figure 9:
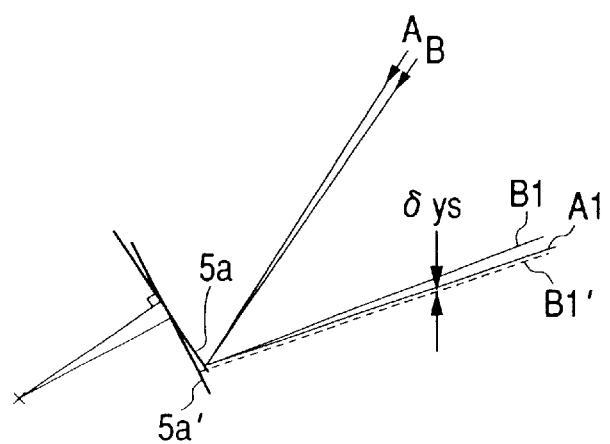
FIG. 9 is a schematic illustration of a deflection surface of a rotary polygon mirror reflecting the principal rays of a pair of light beams at the side where a scanning operation is started.

FIG. 9 schematically illustrates this arrangement. In FIG. 9, the principal rays of two light beams are reflected by the deflection surface of the rotary polygon mirror at the side where a scanning operation is started.

Referring to FIG. 9, the light beam emitted from light emitting section A is reflected by the deflection surface 5a of the rotary polygon mirror in the direction of A1 in FIG. 9 and focussed on the surface to be scanned (surface of the photosensitive drum) 7 by an fθ lens system 6 (not shown) before the emission of the other light beam.

Then, after a predetermined period of time that is equal to δT, the other light beam emitted from light emitting section B is reflected by the deflection surface 5a' of the rotary polygon mirror in the direction of B1' in FIG. 9. As a result, the two beams are focussed at the same spot on the surface to be scanned (surface of the photosensitive drum) 7.

It will be appreciated that the principal rays of the two light beams enter the fθ lens system 6 with a same angle of incidence but at different points that are separated by a distance of δys in the main-scanning direction after having been reflected by the respective deflection surfaces 5a and 5a' of the rotary polygon mirror because they are reflected by the rotary polygon mirror at respective position that are displaced from each other.

If the two light beams are substantially collimated when they enter the fθ lens system 6, they are focussed at a same spot on the surface to be scanned (surface of the photosensitive drum) 7 regardless of the relative displacement δys of their principal rays in the main-scanning direction.

However, if the two light beams are convergent when they enter the fθ lens system 6, they are focussed at respective spots on the surface to be scanned (surface of the photosensitive drum) 7 that are displaced from each other in the main-scanning direction to reflect the relative displacement δys of their principal rays in the main-scanning direction.

Figure 10:
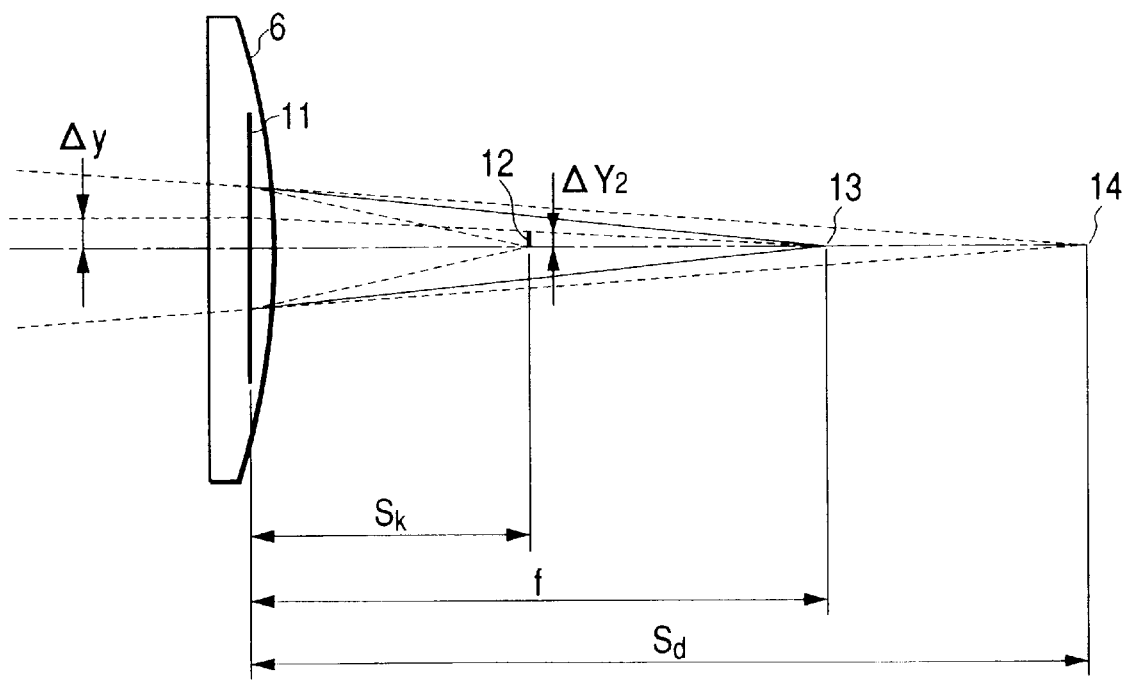
FIG. 10 is a schematic illustration of a principal portion of the optical system of Embodiment 1, showing how the displacement of focal point of the fθ lens system is produced in the main-scanning direction when a pair of convergent light beams enter it.

FIG. 10 is a schematic view of a principal portion of the optical system of Embodiment 1, illustrating this phenomenon. In FIG. 10, reference symbol 6 denotes the fθ lens system. If the distance between the rear principal plane 11 of the fθ lens system 6 and the point of natural convergence 14 of a convergent light beam entering the fθ lens system 6 is Sd, the focal length of the fθ lens system 6 is f and the distance between the rear principal plane 11 of the fθ lens system 6 and the point 12 where the convergent beam entering the fθ lens system 6 is focussed by the latter (on the surface of the photosensitive drum) is Sk, they show a relationship defined by formula (3) below.

$$\frac{1}{SK} = \frac{1}{Sd} + \frac{1}{f} \qquad (3)$$

Therefore, from formula (3) above, f can be obtained by formula (4).

$$f = \frac{Sd \times Sk}{Sd - Sk} \qquad (4)$$

If the relative displacement of the two light beams emitted respectively from the light emitting sections A and B is δy and the relative displacement in the main-scanning direction of the spots formed by focussing the two light beams emitted from the light emitting sections A and B on the surface to be scanned (surface of the photosensitive drum) 7 is δT2 (maximum determined by formula (5) below.

$$\delta Y2 = \frac{f - Sk}{f} \times \delta y = \frac{Sk}{Sd} \times \delta y \qquad (5)$$

Note that the positional displacement δY2 shows a positive value in the direction of increasing the scanning width. Thus, in the case of FIG. 10, δ2 shows a positive value.

Figure 11:
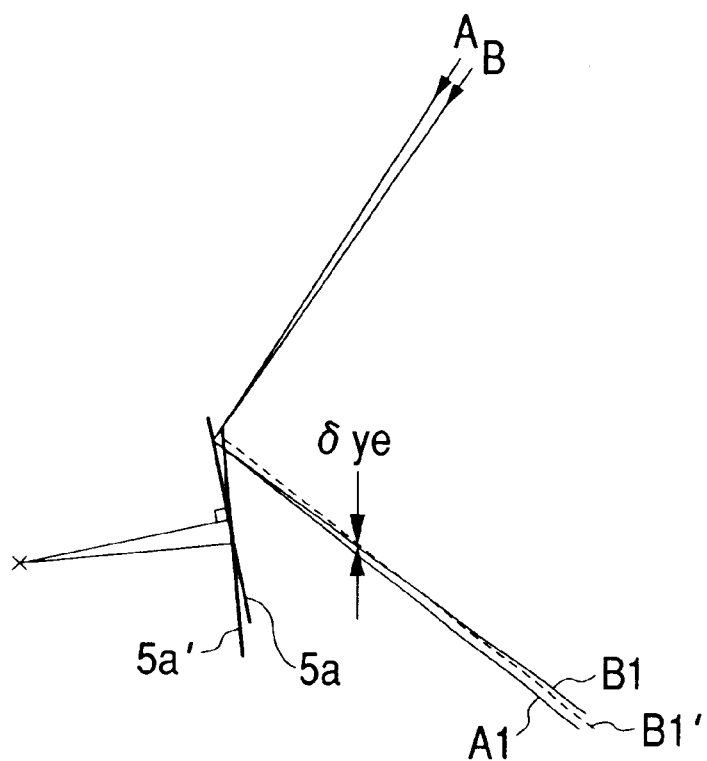
FIG. 11 is a schematic illustration of a deflection surface of a rotary polygon mirror reflecting the principal rays of a pair of light beams at the side where a scanning operation is terminated.

FIG. 11 is a schematic illustration of a deflection surface of a rotary polygon mirror reflecting the principal rays of a pair of light beams at the side where a scanning operation is terminated.

Referring to FIG. 11, the light beam emitted from light emitting section A is reflected by the deflection surface 5a of the rotary polygon mirror in the direction of A1 in FIG. 11 and focussed on the surface to be scanned (surface of the photosensitive drum) 7 by an fθ lens system 6 (not shown) before the emission of the other light beam.

Then, after a predetermined period of time that is equal to δT, the other light beam emitted from light emitting section B is reflected by the deflection surface 5a' of the rotary polygon mirror in the direction of B1' in FIG. 11. As a result, the principal rays of the two beams are displaced by δye from each other in the main-scanning direction when entering the fθ lens system 6.

Figure 12:
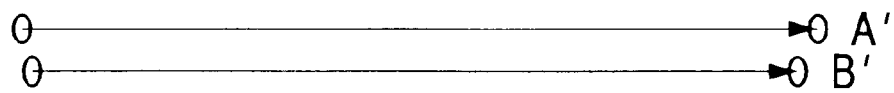
FIG. 12 is a schematic illustration of a pair of scanning lines on the surface to be scanned of the photosensitive drum.

It will be appreciated from FIGS. 9 and 11, the light beam B' emitted from the light emitting section B is displaced toward the optical axis of the fθ lens system 6 relative to the light beam A' emitted from the light emitting section A both at the side where the scanning operation is started and at the side where the scanning optical is terminated so that consequently the span scanned by the light beam B' is shorter than the span scanned by the light beam A' on the surface to be scanned (surface of the photosensitive drum) 7 as shown in FIG. 12 that schematically illustrates a pair of scanning lines on the surface to be scanned (surface of the photosensitive drum).

In other words, when a pair of convergent light beams are made to enter the fθ lens system, the spots of light formed by respectively focussed light beams are displaced from each other in the main-scanning direction on the surface to be scanned (surface of the photosensitive drum) 7.

Thus, this embodiment is so devised that the positional displacement in the main-scanning direction of the spots of light formed respectively by a pair of focussed light beams that is produced when the principal rays of the pair of light beams striking the surface to be scanned (surface of the photosensitive drum) 7 are made to show a predetermined angle of α relative to the normal to the surface of the photosensitive drum 7 in the sub-scanning direction is directed reversely relative to and hence offset by the positional displacement in the main-scanning direction of the spots of light formed respectively by the pair of focussed light beams that is produced if the light beams are convergent when entering the fθ lens system 6. To make this arrangement effective, optimal values are selected respectively for the angle (of incidence) α, the distance Sd between the rear principal plane 11 of the fθ lens system 6 and the point of natural convergence 14 of a convergent light beam entering the fθ lens system 6 and the distance Sk between the rear principal plane 11 of the fθ lens system 6 and the point 12 where the convergent beam entering the fθ lens system 6 is focussed by the latter (on the surface of the photosensitive drum). Then, as a result, the positional displacement of the spots of light formed by any two light beams in the main-scanning direction is substantially totally eliminated on the entire surface of the surface to be scanned (surface of the photosensitive drum) 7.

There may be cases where the principal rays of the pair of light beams entering the surface to be scanned (surface of the photosensitive drum) 7 cannot be made to show a predetermined angle of α relative to the normal to the surface of the photosensitive drum 7 in the sub-scanning direction depending on the configuration of the inside of image forming apparatus. If such is the case, while it is not possible to substantially totally eliminate the positional displacement of the spots of light formed by any two light beams in the main-scanning direction, it may be sufficient to reduce the positional displacement to an acceptable level from the viewpoint of the quality of the image produced on the surface of the photosensitive drum.

For instance, if the scanning lines are arranged with intervals equal to P in the sub-scanning direction, the quality of the produced image will be significantly affected when the positional displacement exceed one third of P, or P/3. In view of this fact, the components of this embodiment are so selected that, if the positional displacement in the main-scanning direction of the spots of light formed respectively by a pair of focussed light beams that is produced when the principal rays of the pair of light beams striking the surface to be scanned (surface of the photosensitive drum) 7 are made to show a predetermined angle of α relative to the normal to the surface of the photosensitive drum 7 in the sub-scanning direction is δT1 and the positional displacement in the main-scanning direction of the spots of light formed on the surface of the photosensitive drum respectively by the pair of focussed light beams that are transformed into convergent light beams by making them to pass through an fθ lens system 6 is δY2, δY1 and δY2 are directed in opposite directions and satisfy the requirement of formula (6) below.

$$|\delta Y1 + \delta Y2| < P/3 \qquad (6)$$

Since δY1 and δY2 are directed in opposite directions, they are prefixed respectively by positive and negative signs or vice versa. With this arrangement, the positional displacement of the spots of light formed by any two light beams in the main-scanning direction is corrected to an acceptable level on the entire surface of the surface to be scanned (surface of the photosensitive drum) 7 from the viewpoint of the quality of the image produced on the surface of the photosensitive drum 7.

While the number of light emitting sections of the light source is assumed to be equal to two in the above description of the embodiment for the purpose of simplification, more than two light emitting sections may be used in the embodiment to improve the effect of the embodiment.

Tables 1 and 2 below show various characteristic values of Embodiment 1 of multi-beam scanning optical system according to the invention.

TABLE 1

| operating wavelength | λ(nm) | 780 |
|---|---|---|
| polygon surface first fθ lens, first surface | d1 | 41.78 |
| thickness of first fθlens | d2 | 9.50 |
| first fθ lens, second surface second fθ lens, first surface | d3 | 7.13 |
| thickness of second fθ lens | d4 | 8.60 |
| second fθ lens, second surface surface to be scanned | d5 | 189.74 |
| first fθ lens, refractive index | Nlens1 | 1.52420 |
| second fθ lens, refractive index | Nlens2 | 1.52420 |
| fθ lens, rear side principal plane point of natural convergence | Sd | 1176.401 |
| fθ lens, rear side principal plane focal point | Sk | 204.695 |
| fθ lens, focal length | f | 251.051 |
| interval separating light emitting spots | d | 0.090 |
| number of light emitting spots | n | 2 |
| angle between light beams entering drum and normal to drum | α | 5.739 |
| angle of incidence of light beams entering polygon | γ | 60 |
| maximum angle of light beams leaving polygon | β | 41.347 |
| polygon ϕ50 hexahedron | | |

TABLE 2

| fθ lens profile | | | |
|---|---|---|---|
| first surface | | second surface | |
| first fθ lens | | | |
| R | −67.970 | R | −49.663 |
| k | −5.593E − 01 | ku | 3.760E − 02 |
| B4 | 1.106E − 06 | B4u | 1.207E − 06 |
| B6 | 5.551E − 11 | B6u | 8.041E − 10 |
| B8 | 0.000E + 00 | B8u | −3.000E − 13 |
| B10 | 0.000E + 00 | B10u | 1.631E − 16 |
| | | k1 | 2.867E − 02 |
| | | B41 | 1.156E − 06 |
| | | B61 | 8.466E − 10 |
| | | B81 | −3.165E − 13 |
| | | B101 | 1.631E − 16 |
| r | −29.500 | r | −22.884 |
| D2 | 0.000E + 00 | D2u | −2.057E − 04 |
| D4 | 0.000E + 00 | D4u | 6.197E − 08 |
| D6 | 0.000E + 00 | D6u | 0.000E + 00 |
| D8 | 0.000E + 00 | D8u | 0.000E + 00 |
| D10 | 0.000E + 00 | D10u | 0.000E + 00 |
| | | D21 | −1.810E − 04 |
| | | D41 | 5.556E − 08 |
| | | D61 | 0.000E + 00 |
| | | D81 | 0.000E + 00 |
| | | D101 | 0.000E + 00 |
| second fθ lens | | | |
| R | 46.718 | R | 45.398 |
| k | −9.145E + 00 | k | −9.476E + 00 |
| B4 | −5.632E − 07 | B4 | −1.035E − 06 |
| B6 | −8.574E − 11 | B6 | 9.461E − 11 |
| B8 | 3.524E − 14 | B8 | −1.308E − 14 |
| B10 | −2.323E − 18 | B10 | 1.959E − 18 |
| r | −68.000 | r | −25.559 |
| D2 | 1.874E − 03 | D2 | 9.964E − 04 |
| D4 | 1.909E − 06 | D4 | −4.929E − 07 |

TABLE 2-continued

| fθ lens profile | | | |
|---|---|---|---|
| first surface | | second surface | |
| D6 | 0.000E + 00 | D6 | 1.260E − 10 |
| D8 | 0.000E + 00 | D8 | −1.582E − 14 |
| D10 | 0.000E + 00 | D10 | 7.640E − 19 |

The profile of the a spherical surface of each of the lenses of the fθ lens system 6 of this embodiment in the main-scanning section can be expressed in terms of an XYZ-coordinate system where the point of intersection of the lens surface and the optical axis of the lens system is selected for the original point and the optical axis is selected for the X-axis, while the axis rectangularly intersecting the optical axis in the main-scanning section is selected for the Y-axis and the axis rectangularly intersecting the optical axis in the sub-scanning section is selected for the Z-axis by formula (7) below:

$$x = \frac{y^2/R}{1+(1-(1+k)(y/R^2)^{1/2}} + B_4 y^4 + B_6 y^6 + B_8 y^8 + B_{10} y^{10}, \quad (7)$$

where R is the radius of curvature and k, $B_4$, $B_6$, $B_8$ and $B_{10}$ are coefficients specific to the a spherical surface. If each of the coefficients shows different values depending on the positiveness or negativeness of the value of y, symbols $k_u$, $B_{4u}$, $B_{6u}$ $B_{8u}$ and $B_{10u}$ as suffixed by u will be used for the respective coefficients that correspond to the positive value of y, whereas symbols $k_1$, $B_{41}$, $B_{61}$ $B_{81}$ and $B_{101}$ as suffixed by 1 will be used for the respective coefficients that correspond to the negative value of y.

On the other hand, the profile of the a spherical surface of each of the lenses of the fθ lens system 6 of this embodiment in the sub-scanning section can be expressed in terms of the radius of curvature r' of the point y in the coordinate system of the lens surface in the main-scanning direction by formula (8) below;

$$r'=r(1+D_2 y^2+D_4 y^4+D_6 y^6+D_8 y^8+D_{10} y^{10}) \quad (8),$$

where r is the radius of curvature of the point on the optical axis and $D_2$ through $B_{10}$ are coefficients specific to the a spherical surface.

If each of the coefficients shows different values depending on the positiveness or negativeness of the value of y, the radius of curvature r' takes a value as determined by using symbols $D_{2u}$ through $B_{10u}$ as suffixed by u to correspond to the positive value of y, whereas the radius of curvature r' takes a value as determined by using symbols $D_{21}$ through $B_{101}$ as suffixed by 1 to correspond to the negative value of y.

As described above, in this embodiment, the positional displacement in the main-scanning direction of the spots of light formed by the convergent light beams focussed by the fθ lens system 6 and the positional displacement in the main-scanning direction of the spots of light formed by the focussed light beams striking the surface of the photosensitive drum 7 and having their principal rays form a predetermined angle of α relative to the normal to the surface of the photosensitive drum 7 in the sub-scanning are made to completely offset and correct each other by appropriately selecting the positions of the light emitting sections A and B and the value of the angle α as shown in FIGS. 6A, 6B and 7.

If an image forming apparatus such as a laser beam printer or a digital copying machine comprising a multi-beam scanning optical system of this embodiment is adapted to provide a recording density of 600 DPI, the parameters P, δ1 and δ2 of formula (6) defining the above requirement will take the following values.

P=0.04233

δ1=+0.00212

δ2=−0.00229

It will be appreciated by seeing the above values that this embodiment satisfies the requirement of formula (6).

$$\delta Y1+\delta Y2=0.00017 \leq P/3=0.01411 \tag{6}$$

In other words, the angle α formed by the light beams striking the surface to be scanned (surface of the photosensitive drum) 7 and the normal to the surface to be scanned in the sub-scanning direction, the distance Sd between the rear principal plane 11 of the fθ lens system 6 and the point of natural convergence 14 of a convergent light beam entering the fθ lens system 6 and the distance Sk between the rear principal plane 11 of the fθ lens system 6 and the point 12 where the convergent beam entering the fθ lens system 6 is focussed by the latter are optimally selected in this embodiment. As a result, the positional displacements of the spots of light formed by the plurality of light beams in the main-scanning direction are substantially completely offset on the entire the surface to be scanned (surface of the photosensitive drum) 7 without sacrificing the focussing performance (of forming spots of light) of the embodiment. Thus, an image forming apparatus comprising a multi-beam scanning optical system according to the invention is adapted to high speed, high density recording.

Embodiment 2

Figure 13A:
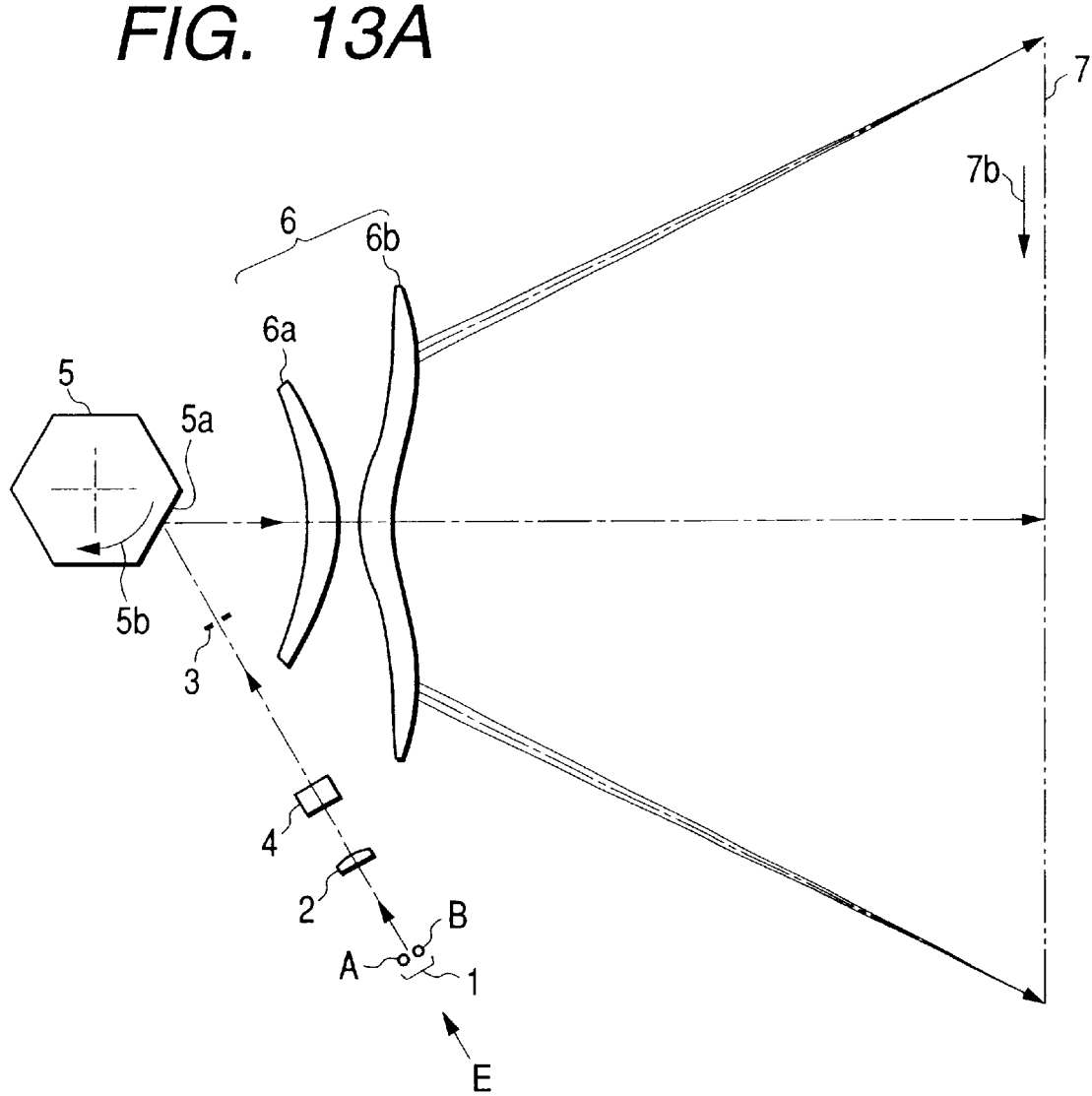
FIG. 13A is a schematic cross sectional view of a principal portion of Embodiment 2 of multi-beam scanning optical system according to the invention and taken along the main-scanning direction.
Figure 13B:
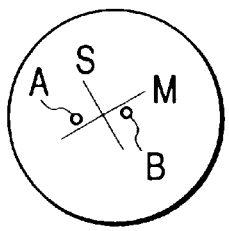
FIG. 13B is a schematic illustration of the arrangement of light emitting sections of the light source of Embodiment 2 of FIG. 13A.
Figure 14:
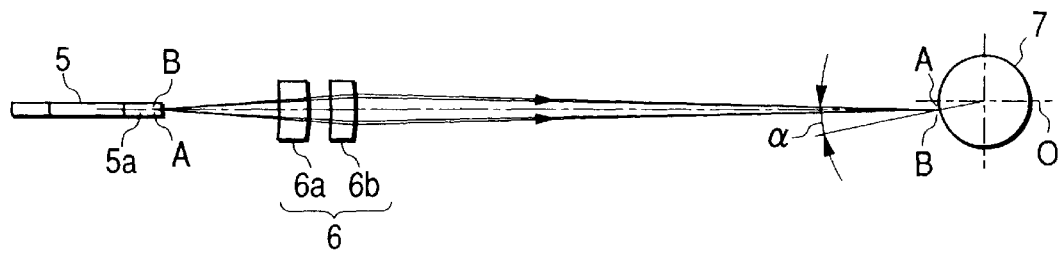
FIG. 14 is a schematic cross sectional view of a principal portion of Embodiment 2 of multi-beam scanning optical system according to the invention and taken along the sub-scanning direction.

FIG. 13A is a schematic cross sectional view of a principal portion of Embodiment 2 of multi-beam scanning optical system according to the invention and taken along the main-scanning direction as it is used in an image forming apparatus such as a laser beam printer or a digital copying machine. FIG. 14 is a schematic cross sectional view of a principal portion of the multi-beam scanning optical system shown in FIG. 13A and taken along the sub-scanning direction. In FIGS. 13A and 14, the components same as those of FIGS. 6A and 7 are denoted respectively by the same reference symbols and will not be described any further. FIG. 13B is a schematic illustration of the arrangement of light emitting sections of the light source of Embodiment 2 of FIG. 13A. As in FIG. 6B, the light emitting sections A, B are encircled and viewed in the direction of arrow E in FIG. 13B. Note that, in FIG. 13B, M indicates the main-scanning direction and S indicates the sub-scanning direction.

This embodiment differs from above described Embodiment 1 in terms of the angle α formed by the principal rays of the light beams striking the surface to be scanned (surface of the photosensitive drum) 7 and the normal to the surface to be scanned in the sub-scanning direction and hence the positions of the light emitting sections A and B. Otherwise, the optical effect of Embodiment 2 is substantially same as that of Embodiment 1.

In this embodiment, the angle α is located under the center line O running in the direction of the optical axis of the photosensitive drum as shown in FIG. 14 due to some necessary degree of freedom for the arrangement of the main body.

With this arrangement, the positional displacement in the main-scanning direction of the spots of light formed by the focussed light beams striking the surface of the photosensitive drum 7 having their principal rays form a predetermined angle of α relative to the normal to the surface of the photosensitive drum 7 in the sub-scanning is not offset but enlarged by the positional displacement in the main-scanning direction of the spots of light formed by the convergent light beams focussed by the fθ lens system 6.

In view of this fact, the light emitting sections A and B of this embodiment are made to show a positional relationship different from that of their counterparts of Embodiment 1 (e.g., by rotating the light emitting sections A and B by a given angle). As a result, the positional displacement in the main-scanning direction of the spots of light formed by the focussed light beams striking the surface of the photosensitive drum 7 having their principal rays form a predetermined angle of α relative to the normal to the surface of the photosensitive drum 7 in the sub-scanning is offset by the positional displacement in the main-scanning direction of the spots of light formed by the convergent light beams focussed by the fθ lens system 6. Thus, this embodiment performs substantially same as Embodiment 1.

It will be seen that, if the plurality of light beams striking the surface to be scanned (surface of the photosensitive drum) 7 is positionally inverted relative to the center line O of the photosensitive drum, the optical effect of the multi-beam scanning optical system is maintained by modifying the positional relationship of the light emitting sections. Then, both the sense of positional displacement in the main-scanning direction of the spots formed by focussing convergent light beams and that of positional displacement in the main-scanning direction of the spots formed by focussing divergent light beams are inverted. Therefore, this embodiment operates exactly effective as Embodiment 1 if divergent light beams are made to enter the fθ lens system 6.

A multi-beam scanning optical system according to the invention and described above can suitably be used for an image forming apparatus such as a laser beam printer (LBP) or a digital copying machine. This will be described below by referring to FIG. 15.

Figure 15:
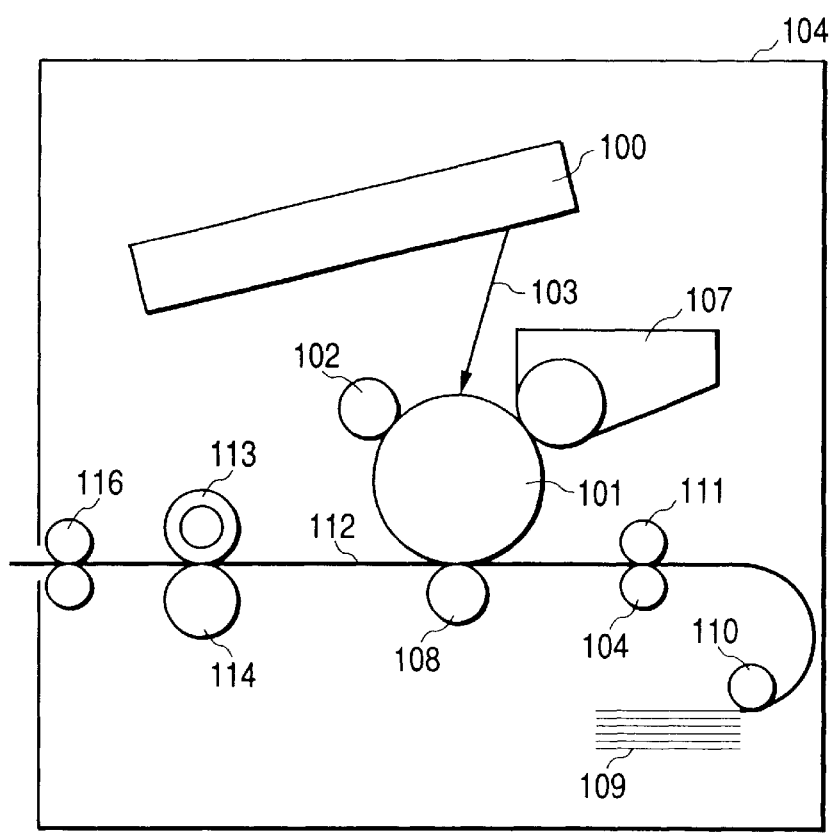
FIG. 15 is a schematic cross sectional view of a principal portion of an image forming apparatus comprising Embodiment 1 or 2 of multi-beam scanning optical system according to the invention taken along the sub-scanning direction.

FIG. 15 is a schematic cross sectional view of an image forming apparatus 104 comprising a multi-beam scanning optical system according to the invention and taken along the sub-scanning direction. In FIG. 15, reference numeral 100 denotes either Embodiment 1 or Embodiment 2 of multi-beam scanning optical system according to the invention. Reference numeral 101 denotes a photosensitive drum operating as an electrostatic latent image carrier. A charging roller 102 adapted to charge the surface of the photosensitive drum 101 uniformly with electricity is arranged above and held in contact with the photosensitive drum 101. The electrically charged area of the surface of the photosensitive drum 101 located downstream relative to the contact line of the charging roller 102 and the drum 101 is scanned by the light beams 103 emitted from the multi-beam scanning optical system 100.

The light beams 103 are modulated according to the image data applied to the optical scanner so that an electrostatic latent image is formed on the surface of the photosensitive drum 101 as the latter is irradiated with the light beams 103. The electrostatic latent image is then developed into a toner image by means of a developing device 107 arranged downstream relative to the area of the photosensitive drum 101 irradiated with the light beam 103 in the sense of rotation of the drum 101 and also held in contact with the photosensitive drum 101. The toner image is then transferred onto a sheet of paper 112 by a transfer roller 108 arranged vis-a-vis the photosensitive drum 101 at a position below the latter. The sheet of paper 112 is fed from a sheet cassette 109 arranged in front of the photosensitive drum 101 (right to the drum 101 in FIG. 15), although it may alternatively be fed with hand. A feed roller 110 is arranged at an end of the sheet cassette 109 and adapted to feed a sheet of paper at a time from the cassette 109 to the transfer route by way of a pair register rollers 111.

Then, the sheet 112 now carrying the unfixed toner image is moved to a fixing device located behind the photosensitive drum 101 (left to the drum 101 in FIG. 15). The fixing device comprises a fixing roller 113 provided in the inside with fixing heater (not shown) and a press roller 114 for pressing the fixing roller 113 so that the toner image on the sheet 112 moved from the transfer section is fixed as the sheet is pressed and heated between the fixing roller 113 and the press roller 114. A pair of delivery rollers 116 are arranged behind the fixing roller 113 to deliver the sheet 112 now carrying a fixed image to the outside of the image forming apparatus.

The present invention can find various applications besides the above described embodiments. The present invention covers any such applications without departing from the scope of the invention specifically defined by the appended claims.

What is claimed is:

1. A multi-beam scanning optical system comprising:
   a light source having a plurality of light emitting sections arranged at respective positions varying from each other in terms of both the main-scanning direction and the sub-scanning direction perpendicular relative to the main-scanning direction;
   a rotary polygon mirror having deflection surfaces for deflecting the plurality of light beams emitted respectively from said plurality of light emitting sections;
   a first optical system arranged on the optical path between said light source and said rotary polygon mirror to transform said plurality of light beams into so many convergent or divergent light beams;
   a second optical system for focussing said plurality of light beams on a deflection surface of said rotary polygon mirror as so many linear images extending in the main-scanning direction after passing through said first optical system; and
   a third optical system for focussing the plurality of light beams deflected by said rotary polygon mirror onto a surface to be scanned of a drum having its axis of rotation extending in the main-scanning direction, said third optical system holding said deflection surface and said surface to be scanned in a substantially conjugate relationship in the sub-scanning direction
   said plurality of light beams striking said surface to be scanned being inclined in the sub-scanning direction so as to make their principal rays to show a non-zero angle relative to the normal to the surface to be scanned, thereby producing a positional displacement among the focal points of the light beams on the surface to be scanned in a first direction parallel to the main-scanning direction, said convergent or divergent light beams entering said third optical system producing a relative positional displacement among the focal points thereof on the surface to be scanned in a second direction parallel to the main-scanning direction, said first direction and said second direction being opposite to each other.

2. A multi-beam scanning optical system according to claim 1, wherein
   the requirement as defined below is satisfied;

$\delta Y1 + \delta Y2 \leq P/3$, where $\delta Y1$ is the maximum positional displacement in said first direction, $\delta Y2$ is the maximum positional displacement in said second direction and P is the gap separating the scanning lines formed on the surface to be scanned by the respective light beams in the sub-scanning direction, $\delta Y1$ and $\delta Y2$ being directed in opposite directions and prefixed respectively by positive and negative signs or vice versa.

3. A multi-beam scanning optical system according to claim 2, wherein
   said $\delta Y1 + \delta Y2$ shows a value substantially equal to zero.

4. A multi-beam scanning optical system according to claim 1, wherein
   said first optical system includes a condensing lens and said second optical system includes a cylindrical lens showing refractive power only in the sub-scanning direction.

5. A multi-beam scanning optical system according to claim 1, wherein
   said third optical system includes a fθ lens system.

6. A multi-beam scanning optical system according to claim 5, wherein
   said fθ lens system includes a pair of toric lenses.

7. A multi-beam scanning optical system according to claim 6, wherein
   each of said toric lenses has at least a lens surface showing an a spherical profile in cross section as taken along the main-scanning direction.

8. An image forming apparatus comprising:
   a multi-beam scanning optical system according to any of claims 1 to 7;
   a photosensitive drum provided with a surface to be scanned and having its axis of rotation extending in the main-scanning direction;
   a developing unit for developing an electrostatic latent image formed on the surface of said photosensitive drum by the light beams made to scan the surface by means of said scanning optical system into a toner image;
   a transfer unit for transferring said developed toner image onto a toner image receiving member; and
   a fixing unit for fixing the transferred toner image on the toner image receiving member.

* * * * *

UNITED STATES PATENT AND TRADEMARK OFFICE
CERTIFICATE OF CORRECTION

PATENT NO. : 6,256,132 B1
DATED : July 3, 2001
INVENTOR(S) : Yoshihiro Ishibe

It is certified that error appears in the above-identified patent and that said Letters Patent is hereby corrected as shown below:

Column 12,
Line 10, "a spherical" should read -- aspherical --;
Line 27, "a spherical" should read -- aspherical --;
Line 45, "a" should be deleted; and
Line 46, "spherical" should read -- aspherical --.

Column 14,
Line 12, "f6" should read -- fθ --.

Column 16,
Line 43, "a spherical" should read -- aspherical --.

Signed and Sealed this

Twenty-sixth Day of March, 2002

*Attest:*

JAMES E. ROGAN
*Attesting Officer*  *Director of the United States Patent and Trademark Office*